UNITED STATES PATENT OFFICE.

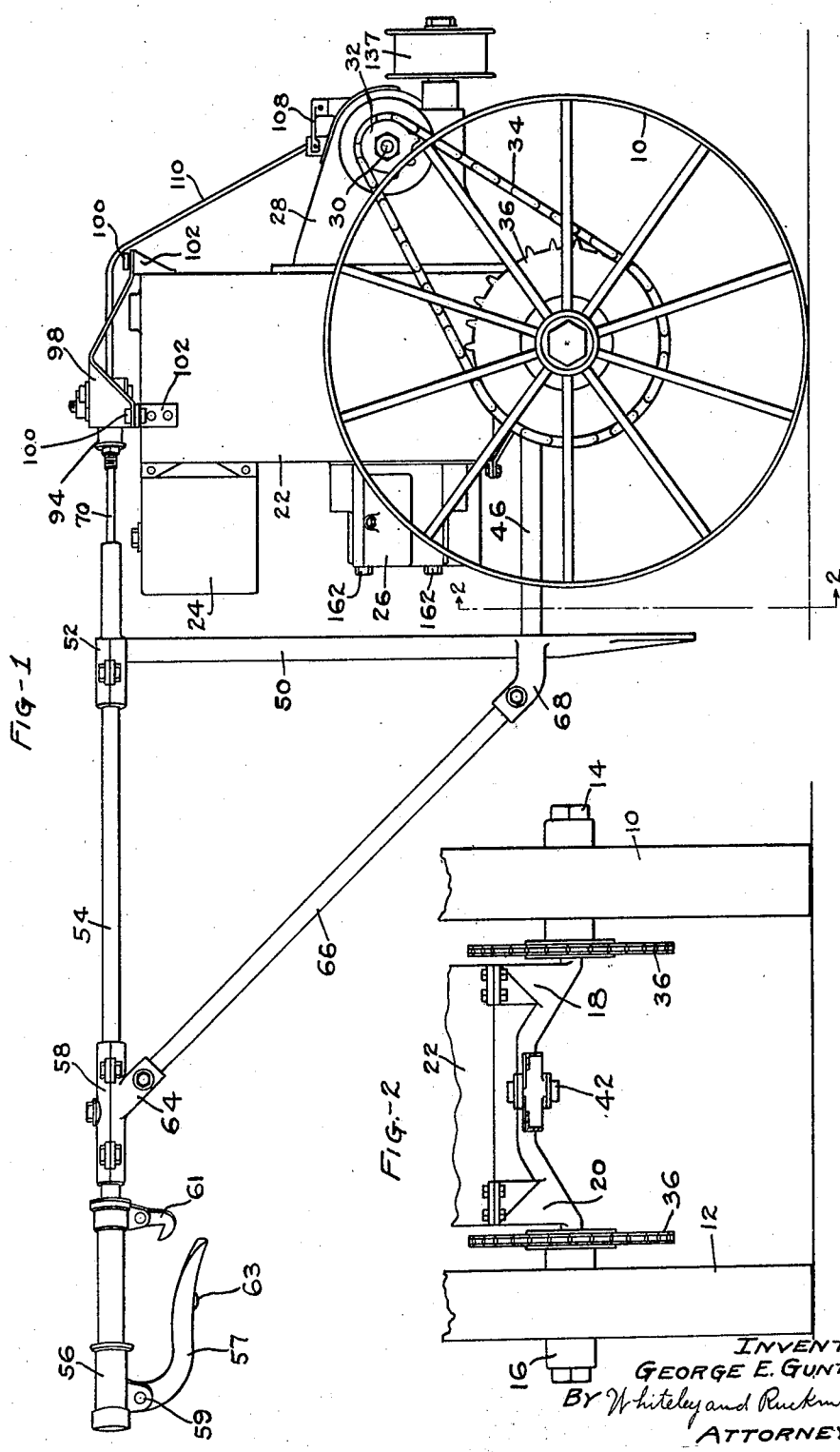

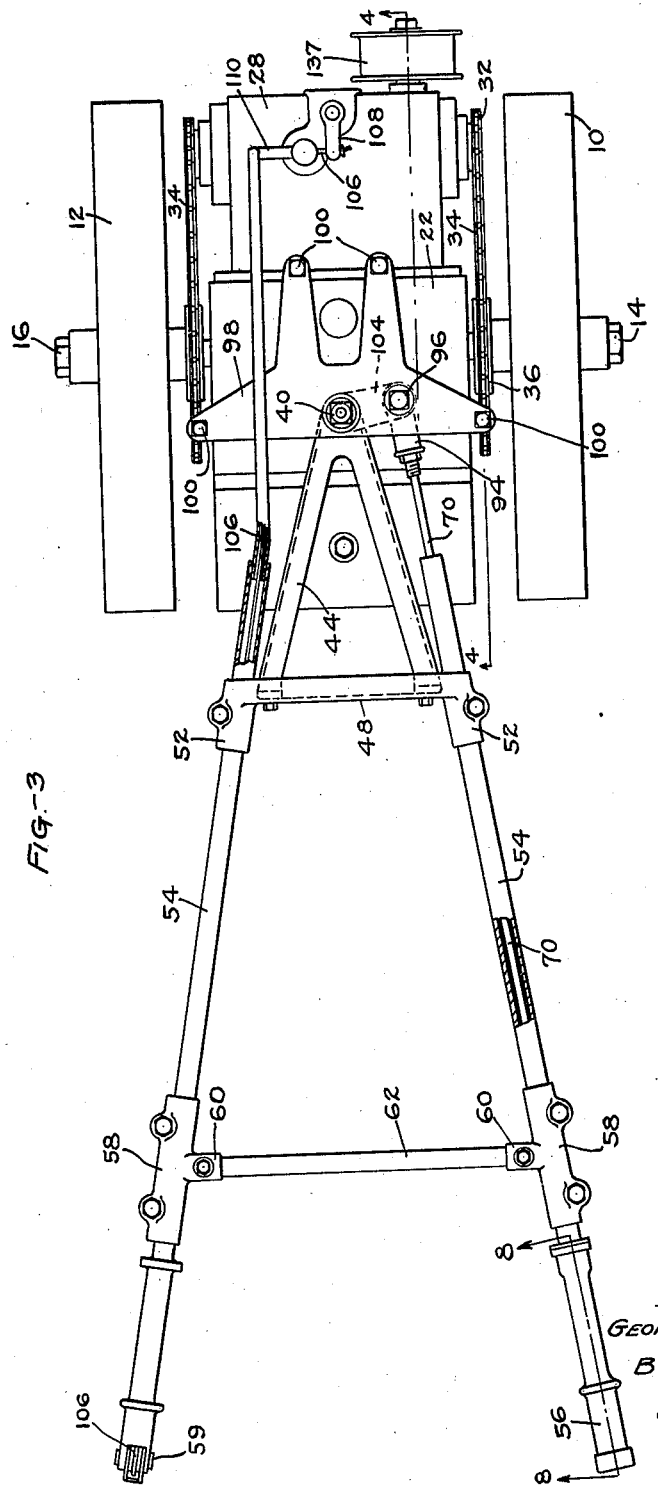

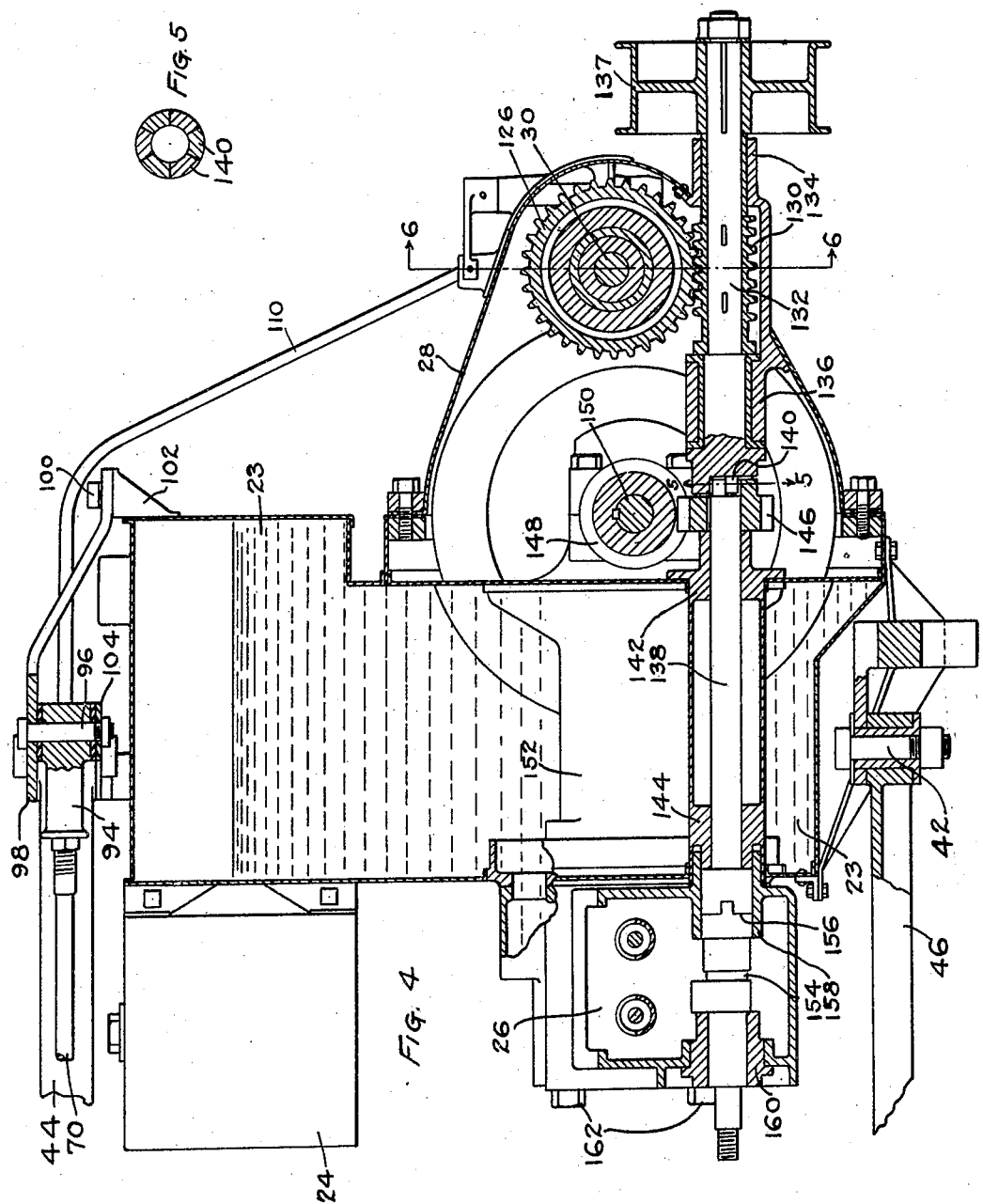

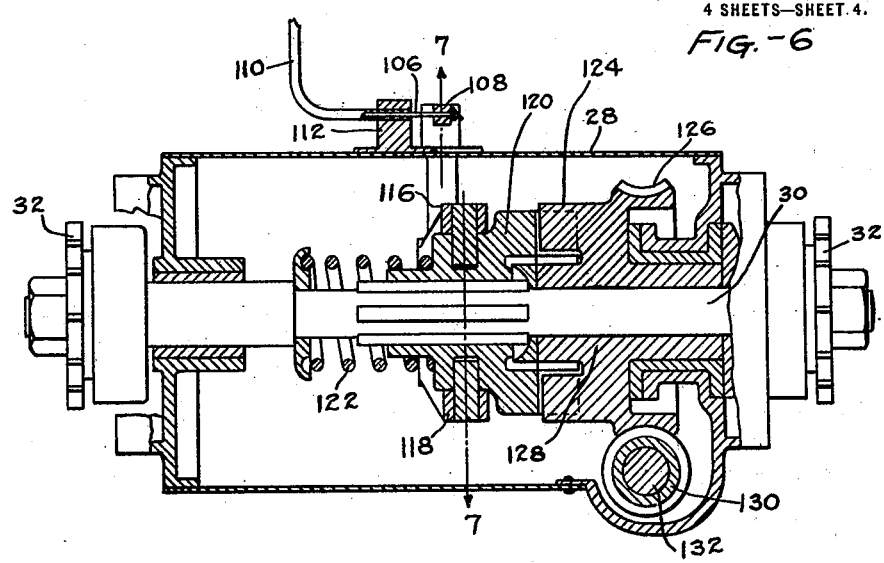
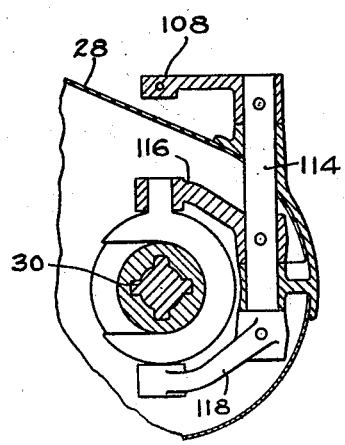
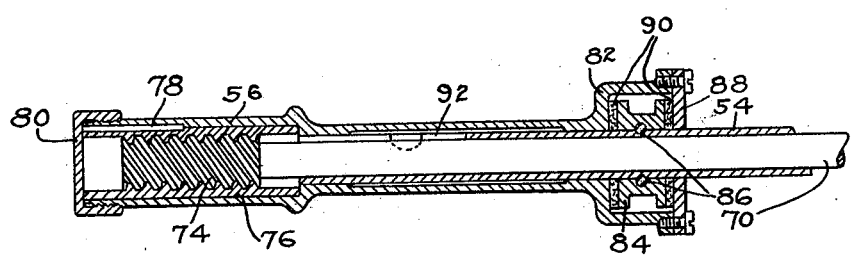

GEORGE E. GUNTHER, OF ST. PAUL, MINNESOTA.

GARDEN-TRACTOR.

1,398,777. Specification of Letters Patent. Patented Nov. 29, 1921.

Application filed April 12, 1920. Serial No. 373,138.

*To all whom it may concern:*

Be it known that I, GEORGE E. GUNTHER, a citizen of the United States, residing at St. Paul, in the county of Ramsey and State of Minnesota, have invented certain new and useful Improvements in Garden-Tractors, of which the following is a specification.

My invention relates to garden tractors and an object is to provide a construction for such devices which will be efficient in operation and easy to manufacture and at the same time, will be of sufficiently light weight so that it may be easily manipulated by the operator.

The full objects and advantages of my invention will appear in connection with the detailed description thereof and the novel features embodied in my inventive idea will be particularly pointed out in the claims.

In the accompanying drawings which illustrate the application of my invention in one form:—

Figure 1 is a view in side elevation of my tractor. Fig. 2 is a view on the line 2—2 of Fig. 1. Fig. 3 is a top plan view. Fig. 4 is a view in vertical section on the line 4—4 of Fig. 3. Fig. 5 is a view in section in line 5—5 of Fig. 4. Fig. 6 is a view in section on the line 6—6 of Fig. 4. Fig. 7 is a view in section on the line 7—7 of Fig. 6. Fig. 8 is a view in section on the line 8—8 of Fig. 3.

Referring to the particular construction shown in the drawings 10 and 12 designate driving wheels mounted on the end portions 14 and 16 of an axle which is carried by brackets 18 and 20 secured to a main support 22 which comprises a casing containing a water receptacle 23 for cooling the engine. The brackets may be integral parts of the axle and as shown in Fig. 2, the end portions incline upwardly and unite with a central integral portion so that greater clearance is obtained. Supported on the casing are a fuel tank 24, a motor or engine 26 and a transmission casing 28, the latter having a shaft 30 extending transversely therethrough and driven in a manner to be described later. Upon the ends of the shaft 30 are secured sprocket wheels 32 which are connected by chains 34 to sprocket wheels 36 secured to the hubs of the driving wheels 10 and 12. The support 22 is pivotally attached at 40 and 42 to the vertices of V-shaped upper and lower members 44 and 46 respectively, the branches of which diverge rearwardly and at the rear ends are attached to transverse bars 48 which are connected by vertical bars 50. The upper transverse bar is provided with sockets 52 through which extend the forward portions of handle members 54 provided at their rear ends with hand engageable members 56 and 57 to be described later. Socketed members 58 are secured around the handle members 54 intermediate their ends. The socketed members 58 are provided with sockets 60 for receiving the ends of a transverse rod 62 and are also provided with downwardly inclined sockets 64 to receive the upper ends of diagonal brace-rods 66, the lower ends of which are received in sockets 68. A truss-frame or auxiliary support is thus formed to which the main support is pivoted for horizontal oscillation. A rod 70 extends through the right handle member 54 and this rod is adapted to be slid forwardly and rearwardly by turning the hand engageable member 56, the construction of which is shown particularly in Fig. 8. The rear end of the rod 70 is screw-threaded at 74 and these threads fit within the threads of an internally screw-threaded sleeve 76 which is secured within the hand engageable member 56 by a key 78 held in place by a cap 80 screw-threaded on the end of the member 56. The forward end of the latter member is enlarged at 82 to receive a collar 84 secured to the handle member 54 by pins 86. The enlarged portion 82 is closed by a plate 88 secured thereto and contains packing 90 at both ends of the collar 84. The rod 70 and the handle member 54 are provided with coöperating keyways to receive a key 92 which prevents rotation of the rod 70 but permits it to slide. It will be evident that the rod 70 will be slid forwardly or rearwardly according to the direction in which the hand engageable member 56 is rotated. The forward end of the rod 70, as shown in Figs. 3 and 4 is attached to a coupling member 94, through which extends a bolt 96 which also extends through a plate 98, secured to the top of the casing by bolts 100 passing through arms on the plate and into lugs 102 attached to the casing. The attachment of the bolt 96 is rendered more secure by a tie-member 104 through which said bolt and the pivot 40 pass. It will now be apparent that by turning the hand-engageable member 56, the rod 70 will be operated to swing the casing and the driving wheels either toward the right or the left, according to the direction in which the member 56 is rotated, so that the tractor is thus readily steered.

The hand engageable member 57 is pivoted at 59 to the rear end of the left handle member 54 as is apparent from Fig. 3. In Fig. 1, the left handle member is hidden by the right handle member and hence the member 57 is shown depending behind the hand engageable member 56. Also depending from the left handle member is a catch 61 adapted to engage the member 57 and hold it upwardly. A wire 106 runs through the hollow left handle member and the rear end of this wire extends around part of the pivoted member 57 and is secured thereto by a rivet 63. The front end of the wire 106 is attached to an arm 108 and the wire runs through a tubing 110 secured at one end to the forward end of the left handle member 54 and at its other end secured to a lug 112 on the transmission casing 28. As best shown in Fig. 7, the arm 108 is secured to a shaft 114 mounted in bearings on the casing 28, and two arms 116 and 118 are also secured to this shaft. The ends of the latter arms have projections extending into an annular groove in a clutch member 120. This clutch member is splined on the shaft 30 and is normally pressed by a spring 122 into engagement with a coöperating clutch member 124 integral with a spiral gear 126 carried by a sleeve 128, loosely mounted on the shaft 30. When the wire 106 is pulled by the hand engageable member 57, the clutch member 120 will be withdrawn from engagement with the clutch member 124 and when the wire 106 is released, the spring 122 will cause the clutch members to engage for the purpose of rotating the driving wheels. The spiral gear 126 is in mesh with a spiral gear 130 secured to a shaft 132 mounted in bearings 134 and 136, and having a pulley 137 secured to the front end thereof for stationary power purposes. The shaft 132 is in effect, a continuation of a shaft 138 being coupled thereto by inter-engaging fingers 140. The shaft 138 is mounted in bearings 142 and 144 and secured to this shaft is a spiral gear 146 with which meshes a spiral gear 148 secured to a crank shaft 150 driven in the usual manner by a piston in the engine cylinder 152. A cam-shaft 154 forms a continuation of the shaft 138 and is detachably connected thereto by a coupling 156. The shaft 154 is mounted in bearings 158 and 160 carried by a detachable head member of the engine 26 secured to the casing by bolts 162. The head member contains the customary inlet and outlet valves and is provided with the customary spark plug. Since the specific construction of the engine forms no feature of my invention as embodied in the present case, a detailed description thereof is not necessary.

The operation and advantages of my invention will be readily understood from the foregoing description. The tractor is easily manipulated and controlled by the operator who walks at the rear and grasps the hand engageable members, by means of which he may readily stop and start the tractor and may steer the same with a high degree of precision. On account of the weight of the engine and operating parts being substantially balanced on the shafts carrying the driving wheels, the operator is not subjected to any unnecessary strain. When the tractor is used for cultivating purposes, one of the cultivator teeth may be run close to the growing plants without danger of digging them up on account of the accuracy with which the tractor may be steered.

I claim:

1. A garden tractor comprising a support, a motor mounted on said support, driving wheels upon which said support is mounted, driving connections between said motor and said driving wheels, a pair of rearwardly extending handle members to which said support is pivoted for horizontal oscillating movement, a hand engageable member movably mounted on one of said handle members, and a rod extending forwardly within said handle member from said hand engageable member and adapted to be slid forwardly and backwardly thereby, the forward end of said rod being attached to said support for imparting oscillating movement thereto.

2. A garden tractor comprising a support, a motor mounted on said support, driving wheels upon which said support is mounted, driving connections between said motor and said driving wheels, a pair of rearwardly extending handle members to which said support is pivoted for horizontal oscillating movment, a hand engageable member rotatably mounted on one of said handle members, a rod extending forwardly within said handle member from said hand engageable member and adapted to be slid forwardly and backwardly thereby, and means for connecting the forward end of said rod to said support to impart oscillating movement thereto when said rod is moved.

3. A garden tractor comprising a support, a motor mounted on said support, driving wheels upon which said support is mounted, driving connections between said motor and said driving wheels, a pair of rearwardly extending handle members to which said support is pivoted for horizontal oscillating movement, a hand engageable member rotatably mounted on one of said handle members, a rod extending forwardly within said handle member, said hand engageable member and the rear end of said rod having screw-threaded engagement with each other, means for permitting sliding movement of said rod while preventing rotative movement thereof, and an arm secured to said support, the forward end of said rod being attached to said arm.

4. A garden tractor comprising a support, a motor mounted on said support, driving wheels upon which said support is mounted, driving connections between said motor and said driving wheels, upper and lower horizontal V-shaped members to the vertices of which said support is pivoted at its top and bottom respectively for horizontal oscillating movement, a pair of handle members extending rearwardly from said upper V-shaped member, a hand engageable member movably mounted on one of said handle members, and means operable by said hand engageable member for imparting oscillating movement to said support.

5. A garden tractor comprising a support, a motor mounted on said support, driving wheels upon which said support is mounted, driving connections including a clutch between said motor and said driving wheels, a frame to which said support is pivoted for horizontal oscillating movement, said frame including a pair of rearwardly extending handle members, hand engageable members movably mounted on said handle members, means operable by one of said hand engageable members for imparting oscillating movement to said support, a wire extending forwardly within the other of said handle members from the other of said hand engageable members and adapted to be pulled thereby, and connections between the forward end of said wire and said clutch for controlling the latter.

6. A garden tractor comprising a main support, a motor mounted on said support, driving wheels upon which said support is mounted, driving connections including a clutch between said motor and said driving wheels, an auxiliary support to which said main support is pivoted, said auxiliary support including handle members extending rearwardly, hand engageable members movably mounted on said handle members, a rod extending forwardly within one of said handle members from one of said hand engageable members and adapted to be slid forwardly and backwardly thereby, the forward end of said rod being attached to said main support for imparting horizontal oscillating movement thereto around its pivotal point, a wire extending forwardly within the other of said handle members from the other of said hand engageable members and adapted to be pulled thereby, and connections between the forward end of said wire and said clutch for controlling the latter.

In testimony whereof I hereunto affix my signature.

GEORGE E. GUNTHER.